United States Patent
Byers

(10) Patent No.: US 6,925,461 B2
(45) Date of Patent: Aug. 2, 2005

(54) PARALLEL RANDOM PROXY USAGE FOR LARGE SCALE WEB ACCESS

(75) Inventor: Simon D. Byers, Summit, NJ (US)

(73) Assignee: AT&T Corp., New York, NY (US)

(*) Notice: Subject to any disclaimer, the term of this patent is extended or adjusted under 35 U.S.C. 154(b) by 505 days.

(21) Appl. No.: 10/022,788

(22) Filed: Dec. 17, 2001

(65) Prior Publication Data

US 2003/0115185 A1 Jun. 19, 2003

(51) Int. Cl.[7] .............................................. G06F 17/30
(52) U.S. Cl. ............................ 707/3; 707/10; 707/100; 707/102
(58) Field of Search ........................ 707/3, 1, 10, 100, 707/102, 104.1; 709/203

(56) References Cited

U.S. PATENT DOCUMENTS

| | | | | |
|---|---|---|---|---|
| 5,737,591 | A | * | 4/1998 | Kaplan et al. .................. 707/1 |
| 6,049,821 | A | * | 4/2000 | Theriault et al. ........... 709/203 |
| 6,332,157 | B1 | * | 12/2001 | Mighdoll et al. ........... 709/217 |
| 6,351,775 | B1 | * | 2/2002 | Yu .............................. 709/238 |
| 6,581,057 | B1 | * | 6/2003 | Witbrock et al. ............... 707/5 |
| 6,701,307 | B2 | * | 3/2004 | Himmelstein et al. ......... 707/3 |
| 6,701,316 | B1 | * | 3/2004 | Li et al. ....................... 707/10 |
| 2002/0052674 | A1 | * | 5/2002 | Chang et al. ............... 700/300 |
| 2002/0069241 | A1 | * | 6/2002 | Narlikar et al. | |

OTHER PUBLICATIONS

Clementini, Eliseo et al., "Modeling Topological Spatial Relations: Strategies for Query Processing", Computer and Graphics, (6): 815–822, 1994.*
"Voroni Diagram", mathworld.wolfram.com/VoroniDiagram.html, undated.*

* cited by examiner

*Primary Examiner*—Luke S. Wassum
*Assistant Examiner*—Susan F. Rayyan

(57) ABSTRACT

A system and method efficiently and anonymously retrieves large scale Web data through a restricted query interface. A number of proxy servers are utilized to permit parallel access to a target Web server for processing multiple queries simultaneously. Latency in the individual queries is absorbed by the proxy servers. Queries that would otherwise appear structured to the target server are assigned to the proxy server in a random fashion, obscuring the structured nature of the queries. The anonymous nature of the queries made by the proxy servers furthermore conceals the identity of the originating server.

1 Claim, 7 Drawing Sheets

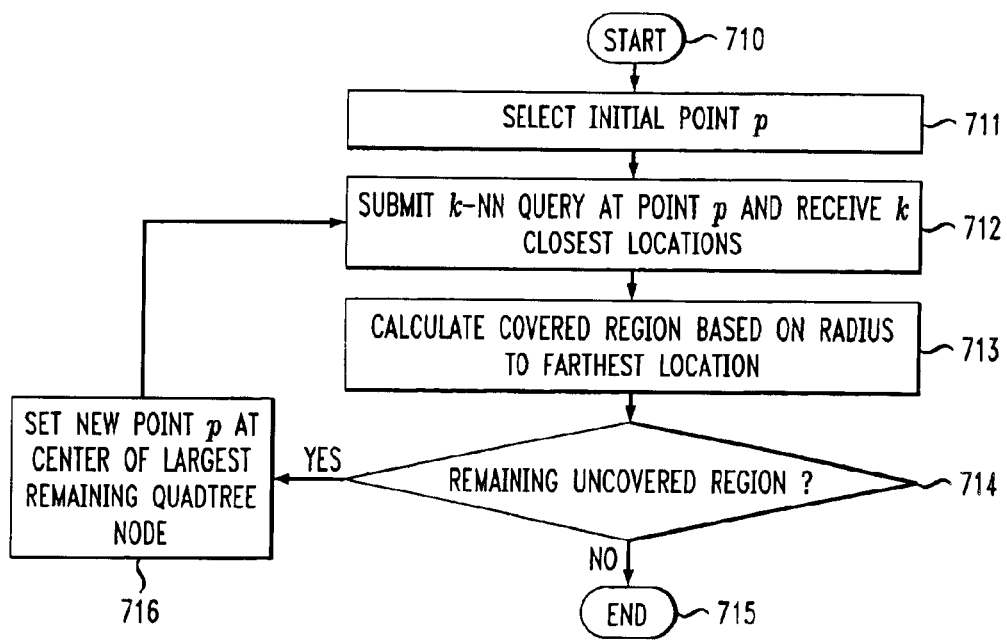

PARALLEL RANDOM PROXY USAGE FOR LARGE SCALE WEB ACCESS

FIELD OF THE INVENTION

The present invention relates generally to information access systems, and, more particularly, to information access systems used to retrieve information from across a communication network.

BACKGROUND OF THE INVENTION

The "hidden Web" has had an explosive growth as an increasing number of databases go on line, from product catalogs and census data to celebrities' burial sites. That information is hidden in the sense that pages displaying it are constructed on demand by query programs that dip into a database not directly available to World Wide Web ("Web") users. It is estimated that 80% of all data in the Web can only be accessed via forms in this manner.

There are many reasons for providing such interfaces on the Web. Transferring big files resulting from broad queries of large databases can unnecessarily overload the Web servers, especially if users are interested in only a small subset of the data. Further, many users may find it very cumbersome to access the particular record they require by directly accessing a database. Giving direct access to the databases through expressive query languages such as SQL or XML-QL is not practical, as those languages are too complex for casual Web users. Form interfaces are thus a good choice as they provide a very simple way to query (and filter) data. A last concern is that of attractiveness to the users and providers. On the provider end, a restrictive form interface (or a series of them, for that matter) allows the presentation of many more advertisement hits than simply presenting a database for the users to search with the browser. For users, a click-intensive point and click interface may be more appealing than a cold and official-looking flat file.

Form interfaces can be quite restrictive, disallowing interesting queries and hindering data exploration. In some cases, the restrictions are intentionally imposed by the content provider to protect its data. For example, a book database and readers' comments presented in a Web site of a bookseller may be competitively important to the bookseller and it would therefore be to the bookseller's benefit to prevent large-scale replication of that data by requiring the use of restricted queries. Frequently, such entities discourage replication of the data available on their Web sites by detecting series of systematic queries or large numbers of queries from a single source.

In other instances, the restrictions appear to simply be the result of poor interface design. For example, the U.S. Census Bureau Tract Street Locator (http://tier2.census.gov/ctsl/ctls.htm) currently requires a ZIP code and the first letter of a street name, making it difficult for users to gather information about all streets within a given ZIP code. As a result of such interfaces, there is a great wealth of information buried and apparently inaccessible in many Web sites.

Retrieving information through restricted interfaces can be a difficult task. Network traffic and high latencies from Web servers often make access times so long that it is not feasible to retrieve data using serial queries through the provided interfaces. Furthermore, because of the methods in place by some providers to discourage data replication, systematic queries may not be possible. It would be advantageous to have a method of presenting large-scale queries to Web databases that solves those problems.

SUMMARY OF THE INVENTION

The present invention is a method for posing a plurality of queries over a network to a target server using random proxy servers located on the network. By using a plurality of random proxy servers, a relatively large number of queries may be processed in parallel, minimizing the effects of the target server latency and Web traffic delays. Furthermore, because the target server actually receives the queries from different, random servers on the network, patterns in the queries are difficult to detect and the identity of the server actually originating the queries is concealed.

In a preferred embodiment of the invention, a machine readable medium is provided containing configuration instructions for performing a method. The method is for retrieving a database view accessible by posing a plurality of queries over a network to a target server. A plurality of proxy server services is first selected for use in the method. Each of the plurality of queries is transmitting to one of the proxy server services for transmission to the target server. For each one of the plurality of queries, a reply from said target server is received from a corresponding proxy server service. The database view is then constructed from the replies received from the proxy server services.

The selecting step may include searching the network for proxy server services and, for each service found in the searching step, testing the service using test criteria. Those services meeting the test criteria are then used. The test criteria may include retrieval time, or the number of errors in a response to a test query. In selecting the proxy services, both a primary list of proxy services meeting a first set of criteria and a secondary list of proxy services meeting a second set of criteria may be compiled.

The selected proxy server services may be ranked according to test criteria, in which case the transmitting step includes transmitting the query to the best-ranked available proxy server service.

Several steps may be added to obscure the existence and identity of the party creating the database view. Dummy queries may be added to the plurality of queries to be assigned and transmitted. A substantially unpredictable pause may also be inserted before performing the transmitting step. Further, the transmitting step may include transmitting the queries to randomly assigned proxy server services.

The method may also include the step of constructing at least one of the queries based on replies received in response to previous queries. Where the database view is of a database having a restricted interface that returns the k data points closest to a query point, then a query may be constructed by calculating a maximum radius from a previous query point to a data point returned by the corresponding query, determining a region within R covered by the previous query based on the corresponding maximum radius, computing quadtrees of progressively greater levels until a computed quadtree has an uncovered node entirely outside the covered region, and submitting a query containing a query point that is a center of the uncovered quadtree node.

These and other advantages of the invention will be apparent to those of ordinary skill in the art by reference to the following detailed description and the accompanying drawings.

BRIEF DESCRIPTION OF THE DRAWINGS

FIG. 6 is a table showing efficiencies of the method as k varies; and

FIG. 7 is a block diagram illustrating a method for generating queries according to one embodiment of the present invention.

DETAILED DESCRIPTION

In a preferred method according to the invention, a list of proxy server services is compiled by searching the Web for available proxy server services, and then testing those services for speed and quality. The proxy server services meeting the test criteria are then used to systematically retrieve query results from the target server in a parallel manner, reducing total access time and randomizing the sources of the queries, the order of the queries or both. The queries may be selected systematically to minimize their number.

Figure 1:
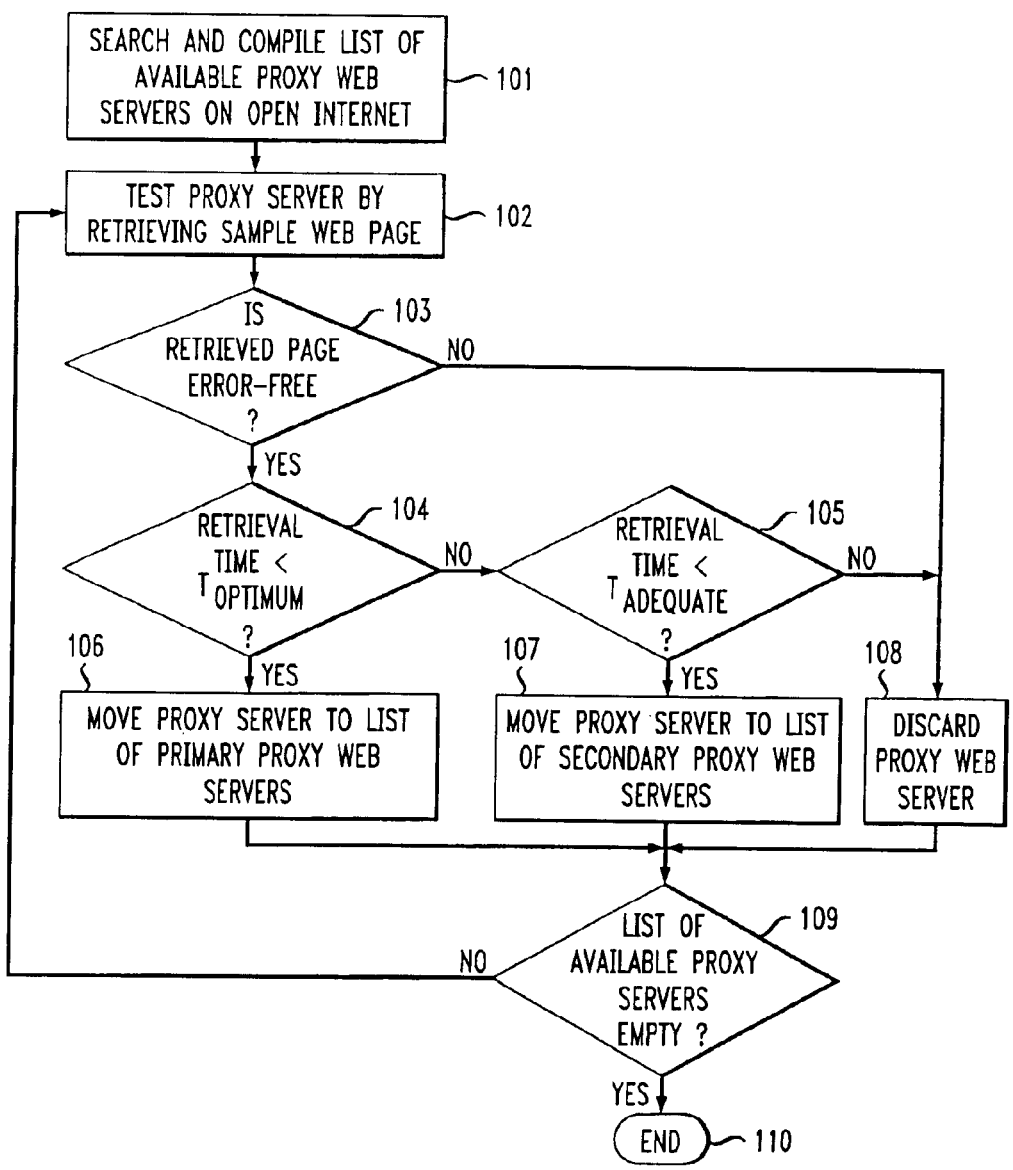
FIG. 1 is a block diagram illustrating a method of selecting proxy server services according to one embodiment of the present invention.

FIG. 1 shows a diagram of a semi-automated method for searching the Web for available proxy server services and for testing the found services. In step 101, the open Internet is searched for available proxy server services. The search may utilize one or more commercially available search engines using key words likely to yield free, anonymizing proxy services. As presently implemented, the search is conducted manually off line to create a list of proxy service candidates that is used as an input to the automated proxy testing method described below. Alternatively, the search results may be automatically parsed for input fields, and the testing automatically initiated for each proxy server candidate as it is found.

If the proxy list compiled in step 101 is compiled offline, a proxy service address is read from the list in step 102 and a test query is submitted to the proxy service to retrieve a sample Web page served by a sample target server at a specified URL. If the list is compiled as part of an automated searching and testing process, the test query is sent when the proxy service is identified.

The sample Web page has known and stable contents. Preferably, the target server serving the sample Web page is under control of the testing party to assure that the contents of the sample Web page do not change during the test procedure. The test query, including the specified URL of the sample Web page, is transmitted by the proxy server to the target server serving the sample Web page. The Web page is retrieved by the target server and is transmitted to the proxy server in response to the query. The proxy server retransmits the received sample Web page to the testing server.

After a sample Web page is retrieved, it is examined for errors at step 103. In one embodiment of the invention, the sample Web page has known contents at the time of the sample retrieval, and those contents are compared to the contents of the sample Web page received from the proxy server. If the contents match perfectly then the sample Web page received from the proxy server is error-free, and the proxy testing method proceeds to examine the elapsed retrieval time at step 104. If the contents of the page retrieved by the proxy server are not identical to the known Web page contents, then the proxy is removed from the list of available proxies at step 108.

In an alternative embodiment, the testing server sends queries for the same Web page substantially simultaneously to the proxy server and directly to the sample target server. The responses to those queries are compared as described above. That embodiment is useful where the testing party does not have a Web server of its own.

While in the preferred embodiment no errors are permitted in the returned Web pages, it is possible to set the error criterion to be less stringent, permitting some predetermined number of errors in the returned pages. Furthermore, the criteria may be different for different types of errors. Errors in the actual data of interest may be absolutely barred, while a small number of formatting errors that will not affect the results of the data collection method of the invention may be permitted.

If the returned Web page is found to meet the error criteria, retrieval time is next examined at step 104. Retrieval time is defined as the running time between sending out the query to the proxy server and receiving results from the proxy server. The time therefore includes four server-to-server Web transfers: testing server-to-proxy, proxy-to-target server, target server-to-proxy and proxy-to-testing server. Because of the included Web transfer times, the retrieval time therefore depends somewhat on Web traffic volume, which is a variable not in control of the proxy or the testing server. The present method, however, is capable of eliminating those proxy servers that have a latency that is comparatively large compared to the delays due to Web traffic.

If the retrieval time measured in step 104 is found to be within a $T_{optimum}$, then the proxy server is placed on a list of primary proxy servers (step 106) to be used in the data collection method of the invention. If, however, the retrieval time is found to exceed $T_{optimum}$ but to be less than a $T_{adequate}$ (step 105) the proxy server is placed on a list of secondary proxy servers (step 107) to be used in cases where the primary proxy servers have been exhausted. If the proxy server meets neither of the retrieval time criteria, then that proxy server is discarded at step 108. One skilled in the art would recognize that more or less than two retrieval time classifications may be used. By classifying the proxy servers according to retrieval time, the overall performance of the data collection method of the invention is improved by assuring that the faster proxies are all in use before calling on a slower proxy server.

The proxy testing method continues until no more proxy servers are untested (step 109), or, alternatively, until a sufficient number of acceptable proxy servers has been found. The testing then terminates (step 110) and the lists of acceptable proxy servers are available for the data collection method of the invention.

The proxy testing method may be performed periodically as part of a background maintenance of the proxy access system. In that case, it is not necessary to search for and test proxy services before each execution of the data collection method of the invention. Alternatively, the proxy testing method may be executed each time the data collection method is executed, or when the data collection method is executed after a minimum time period from the last execution.

Additional testing criteria for accepting proxy servers may be added to those illustrated in FIG. 1. For example, if the target server used for testing is under control of the testing party, then for each query relayed by a proxy server, the target server may report to the test server the source address of the query. That permits the test server to evaluate the anonymizing capabilities of the proxy server.

Figure 2:
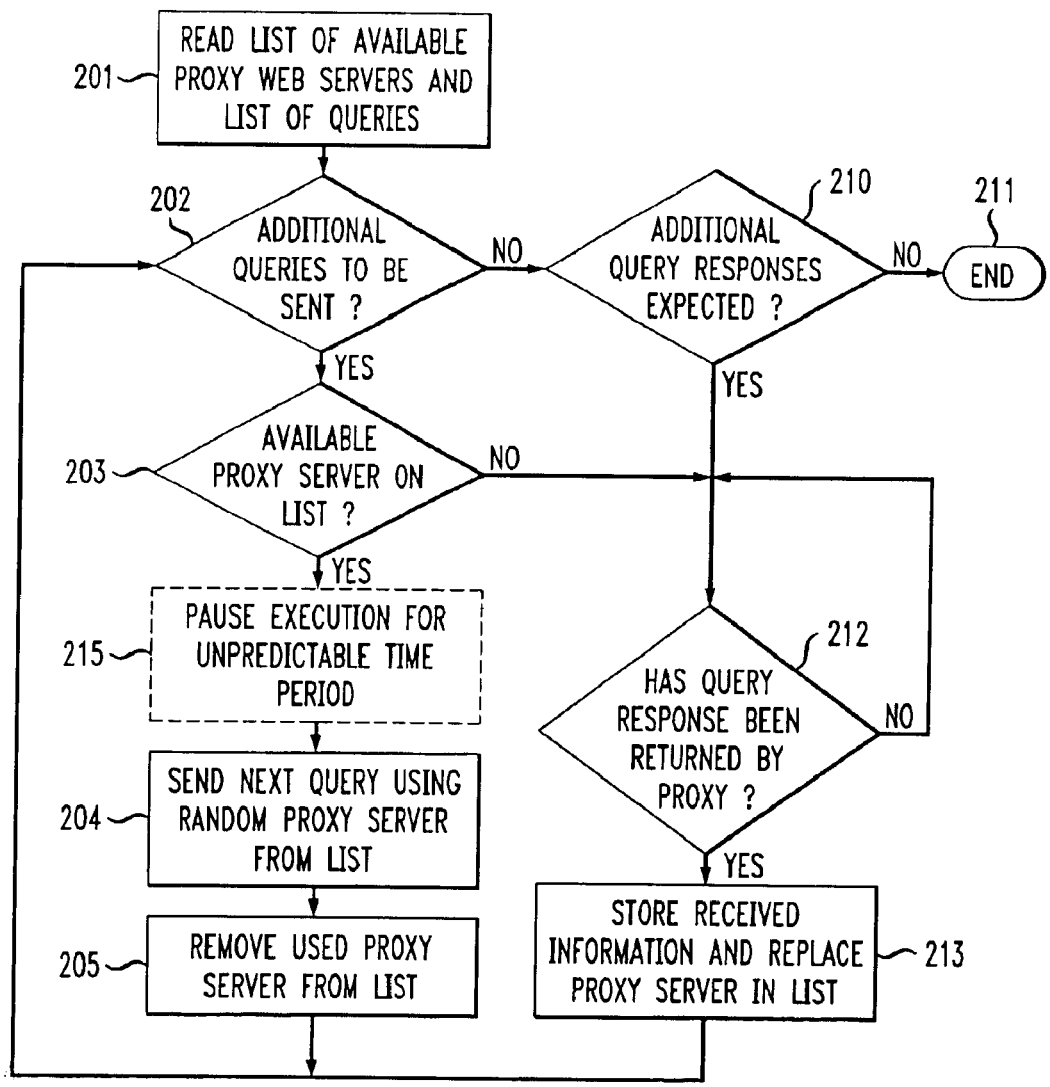
FIG. 2 is a block diagram illustrating a method for retrieving information using random proxies according to one embodiment of the present invention.

FIG. 2 illustrates the retrieval of information from a Web site using a random data collection method according to one embodiment of the invention. A client server initially retrieves a list of available proxy servers in step 201. The list is preferably a file created during execution of the proxy testing method illustrated in FIG. 1. Alternatively, the client server retrieves a list of proxy Web servers having services known to meet the requirements of the retrieval method.

Additionally, a list of target queries is retrieved in step 201. The list of queries is preferably chosen to minimize the number of queries required to compile the desired information from the Web site or sites. In an illustrative example, a user desires to create a view of a database of all retail store locations of a firm in the United States. A Web site of that firm offers store locations by entering a ZIP code or alternatively by entering a state. Assuming that the Web site returns all store locations within the specified region, it can be seen that the number of queries may be significantly reduced by retrieving the locations by state (50 accesses) instead of by ZIP code (about 10,000 accesses).

In cases where the number of results per query is limited, or where the query interface is otherwise restricted, it may be advantageous to formulate queries based on the results received from previous queries. One such specialized technique, dealing with spatial coverage and applicable to the store location problem, is described below.

After the list of available proxy servers and the list of queries are prepared, data collection begins. If there are unsent queries (step 202), as there are at the start of the method, the method then checks whether there is an available proxy server on the proxy server list (step 203). Again, at the start of the method, there presumably are available proxy servers. As will be described below, proxy servers are removed from the list as they are used. In a preferred embodiment of the invention, if the primary list of proxy servers is depleted, then the secondary list of proxy servers is used. As described with reference to FIG. 1, for example, a secondary list of proxy servers having a longer, but still acceptable, retrieval time may be used.

If there are no proxy servers available in step 203 (because all are in use retrieving information), then the system proceeds to check for outstanding query responses received from the proxies in use (step 212).

Assuming a proxy server is available, the system transmits (step 204) a query to a proxy server for transmittal to the target server. In a preferred embodiment, the proxy server is selected randomly from the proxy server list. If a primary list and a secondary list are both being used, the system will randomly choose proxy servers from the primary list before randomly choosing proxies from the secondary list. If the queries are predetermined before data collection begins, then the proxies may alternatively be used in a fixed order while the queries are randomized. That embodiment has the advantage of randomizing the order in which the target server receives the queries, making it more difficult to detect systematic data retrieval.

The system may pause (step 215) for an unpredictable (random or pseudorandom) period of time before sending each query to a proxy. Such pauses reduce the periodic characteristics of the queries, further masking the systematic nature of the data retrieval. Similarly, the system may send a random or pseudorandom query to a proxy server interspersed among the queries formulated to build a database view. In that way, the target server is less likely to detect a systematic query structure.

After a query is sent to a given proxy server, that proxy server is removed (step 205) from the list of available proxy servers used to transmit queries. The method then returns to step 202 of determining whether there exist any additional queries to be sent.

If there are no additional queries to send because all queries required to retrieve the desired database view have already been sent to proxy servers, then the system further determines whether it is expecting any additional query responses (step 210). At any given time during execution of the method, it is likely that the system will have outstanding queries that have been sent to proxies but for which no response has been received. If no such query exists, and all queries have been sent out (step 202), then the process is complete and the method is terminated (step 211). If there are outstanding queries, the system continues to check for query responses (step 212) until one is received. Upon receipt of a query response, the information received from the proxy is stored (step 213) as part of the target database view, the proxy is replaced on the list of available proxy servers, and the method returns to the step 202.

The flow chart of FIG. 2 is intended to present the flow of an exemplary program to perform the method of the invention. One skilled in the art will recognize that the flow chart of FIG. 2 represents one of many logical representations of the data collection method of the invention, and that other program flows would perform the method equally well.

Figure 3:
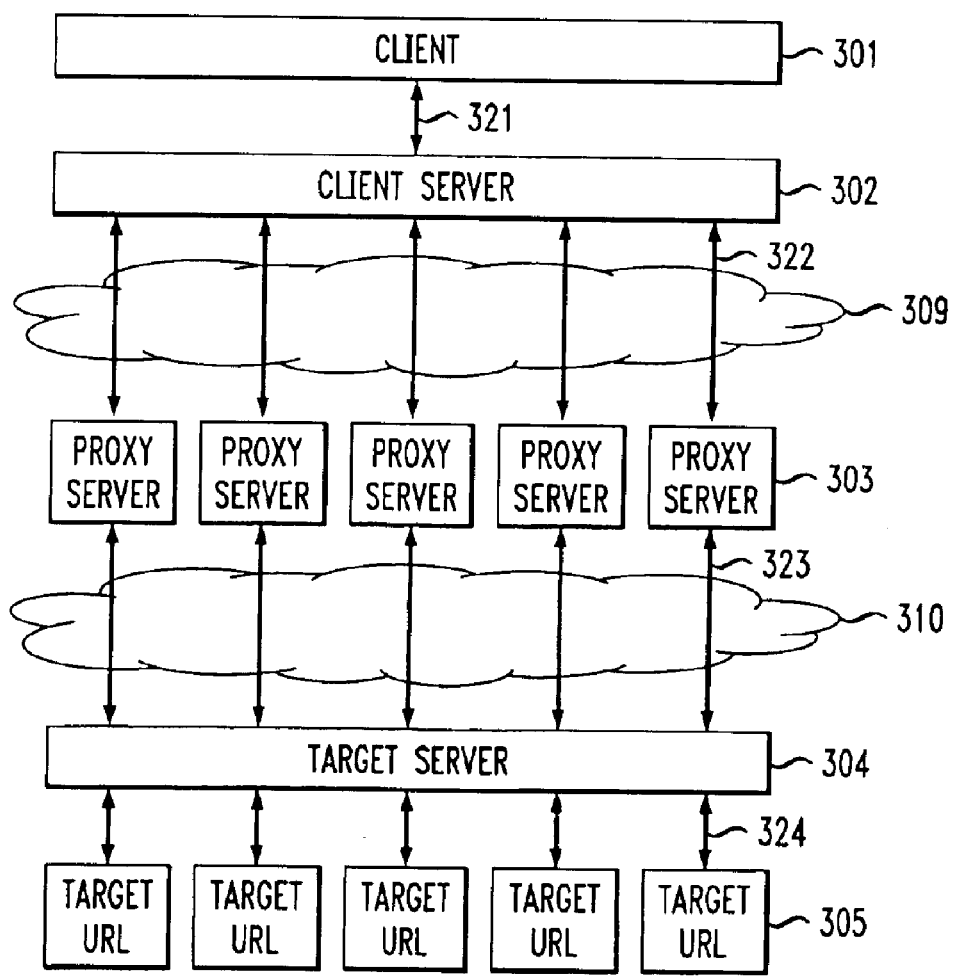
FIG. 3 is a block diagram illustrating a system for retrieving information according to one embodiment of the present invention.

FIG. 3 is a schematic view of a network in which the method of the invention may be practiced. A client 301 provides a user interface for a client server 302. Results of the queries are presented to the user through the client. Software for performing the method of the invention is preferably executed by the client server 302 and resides as an executable file that is accessible by the client server. The client and client server may physically reside in the same machine, or may be in different machines that communicate, for example, through a local area network 321.

The client server establishes IP connections 322 to proxy servers such as server 303, as required. The connections are established via the network 309 on which the proxy servers are located; in the exemplary embodiment, that network is the Internet. As can clearly be seen in FIG. 3, multiple connections 322 to multiple proxies 303 may be established in parallel, reducing the effects of target server latency and delays caused by Web traffic.

Upon receipt of the queries from the client server 302, each of the proxy servers 303 establishes a connection 323 via network 310 to the target server 304. Again, in the preferred embodiment, the network 310 is the Internet. One skilled in the art will recognize that the target data may reside on more than one server. In any case, queries forwarded to the proxy servers 303 by the client server 302 contain an address of a target server for the particular query sent. The queries are received by the target server 304 through the connections 323 from a randomized sequence of proxy servers 303 that anonymizes the originating server. It is therefore difficult for the target server to detect a pattern in the queries.

After the target server 304 receives each query from the proxy servers 303, it retrieves the requested information. In the illustrated example, the data resides in one or more databases located by target URL's 305. The target server retrieves the data using connections 324 which may be local area network connections, internal connections to database files, Internet connections or any other connection appropriate for the location and transfer of the data.

The target server 304 then transmits the requested data as replies to the proxy servers 303, which relay the data to the client server 302. In the preferred embodiment in which the data is transferred via the Internet between the target server and proxy servers and between the proxy servers and the client server, that data is contained in HTML pages transferred via HTTP protocol. The client server extracts the data from the HTML pages for storage as part of the desired database view.

As noted above, the set of queries chosen to cover a given database view strongly affects the efficiency of the described method for retrieving a database view. An important subclass of the coverage problem is the problem of covering a given spatial region in the presence of restricted queries. Specifically, given a query interface for nearest-neighbor queries of the type "find the k closest stores to a particular location," and a region R, the goal is to minimize the number of queries necessary to find all the stores in R.

In general, R is assumed to be some compact (closed and bounded) subset of $\Re^n$. This strong theoretical assumption simplifies several practical issues. First of all, because R is a subset of $\Re^n$, nearest-neighbor queries may be performed under traditional distance metrics. Also, by assuming the domain is a compact subset guarantees that a finite coverage exists. Without that condition, it would not make sense to look for a cover, since, in general, it is impossible to find finite covers for subsets of $\Re^n$ with open balls. Furthermore, while in principle the coverage method described below works for any number of dimensions, this discussion shall focus on the two-dimensional case.

A naive technique for finding a cover of a region is simply to break the region R into small pieces, then perform one query for each piece (for example, for the centroid of each region). That technique is commonly used on the World Wide Web, where, for example, all the stores of a particular chain may be found by performing one query per ZIP code. While this does not guarantee coverage, since only k stores are located per query and it might happen that more than k stores belong to a single ZIP code, in practice, it often produces satisfactory results.

Given that there are several thousand ZIP codes in the United States, that technique is likely to be very time consuming. Also, that technique does not explore the data-sensitive nature of the k-NN (nearest neighbor) queries being performed, because it does not take into account the coverage radius returned by the query. A large radius returned by a query may cover neighboring regions, making it unnecessary to query those regions separately. The method described below explores such variations to achieve an efficient solution.

In general, the query generation method includes two parts: (1) use a spatial data structure to keep track of which parts of R have already been covered by previous queries, and (2) at any given point in time, use the coverage information obtained thus far to determine where to perform the next query so as to minimize overlaps. The method uses a simple greedy scheme for maximizing the profit of queries, and assumes that the best place to perform a query is the largest empty circle in the uncovered region. The largest empty circle of an unrestricted collection of points belongs to the Voronoi diagram and can be computed in O(n log n) time (in two and three dimensions). In the present example, where some regions of space will be covered, the largest uncovered empty circle belongs to the medial-axis of the uncovered region. Computing the medial-axis is a non-trivial task, and it gets considerably harder as the dimensions increase. One approach may be to approximate the medial-axis using the notion of poles. In the presently described method, a simpler approximation is used based on recursive data structures; specifically, the method uses the centers of the quadtree nodes.

In practice, the quadtree is used to mark which regions of R have been covered. The unmarked regions are the regions of space which have not been seen, and for which no information is available. Given a query point p∈R the output of the query is a list of neighbors $n_1, \ldots, n_k$ of p. The method marks on the quadtree the nodes inside a ball centered at p, and of radius $r=\max\|n_1-p\|$. Instead of actually computing the medial-axis transform, the largest uncovered quadtree node is found, and its center is used as the next query point.

Note that the quadtree is used for two purposes: to determine coverages, and decide when we can stop; and to determine the next query. An advantage of using a recursive data structure such as the quadtree is that it facilitates scaling the technique to higher dimensions.

An example program flowchart for performing the query generation method is shown in FIG. 7. The method is started (step 710) for execution concurrently with the information retrieval method of FIG. 2. An initial point ρ is selected (step 711) for performing a first query. The point may be selected arbitrarily or may be selected for maximum overall efficiency of the method.

A query is submitted to the target Web site for the k closest locations to the point ρ, and a response is received (step 712). The location of the point ρ may be identified as a ZIP code, as a political subdivision such as a state or a county and state, as map coordinates or as other means depending on the capabilities of the Web site query structure. Based on the data received in response to the query, the location having the maximum radius from the point ρ is identified, and the region covered by the response is determined (step 713). In the two-dimensional example described herein, where the covered region is a region on a map, the covered region is circular. One skilled in the art will recognize that the method may also be performed to cover space having three or more dimensions.

The remaining uncovered regions are now examined (step 714). If there are no remaining uncovered regions, the process is complete (step 715). If there are remaining uncovered regions, the method approximates the largest of those regions, and calculates a new point ρ (step 716). In the preferred embodiment, the largest region is approximated using the largest uncovered quadtree node, and point ρ is the center of the node. One skilled in the art will recognize that other techniques may be used to approximate the center of the largest uncovered region.

Figure 4A:
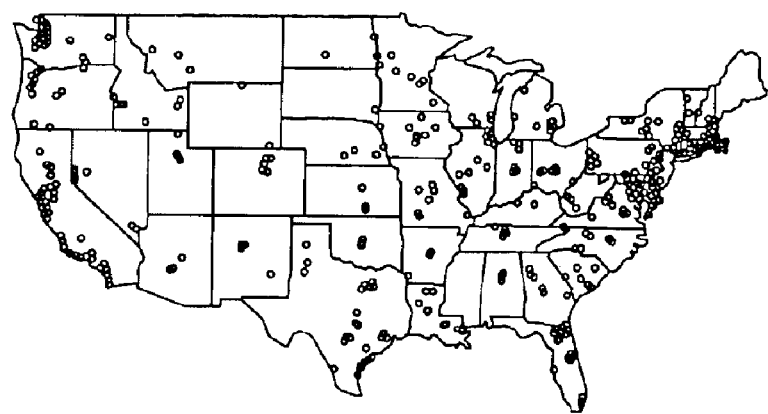
FIGS. 4A and 4B are graphical depictions of data used in demonstrating the method for retrieving information.
Figure 4B:
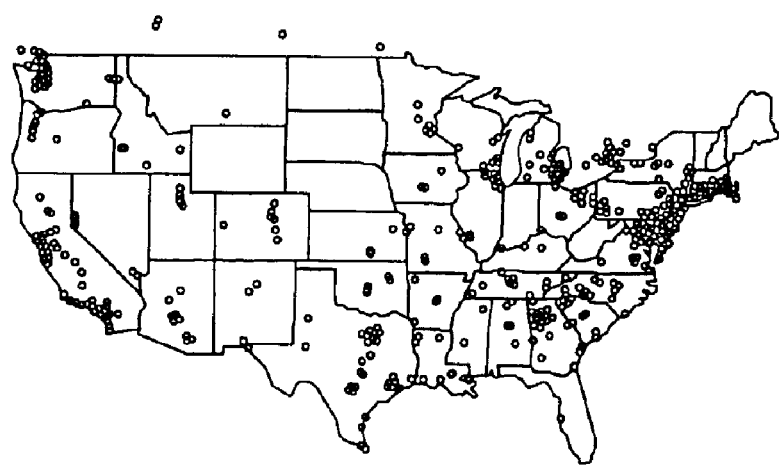
Figure 5A:
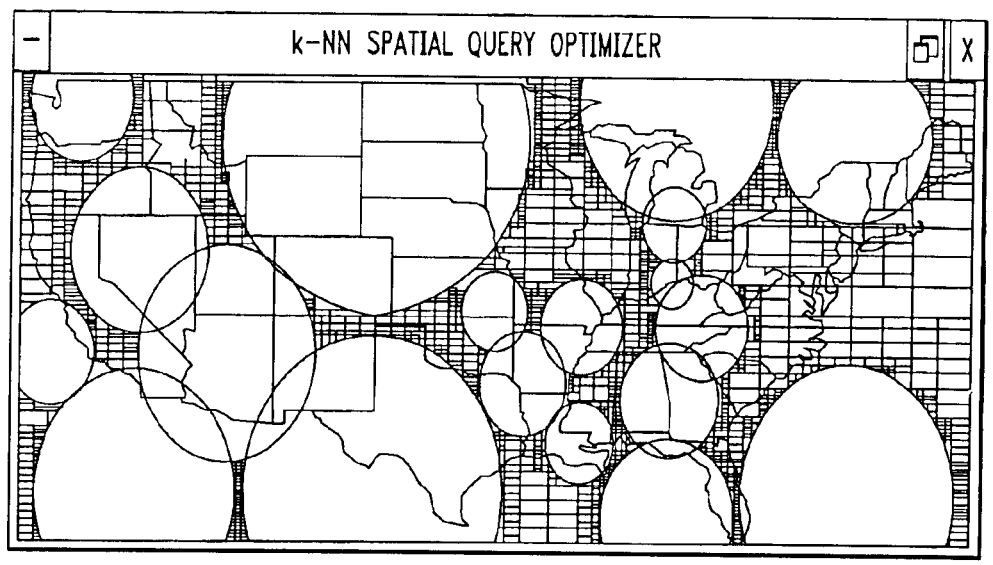
FIG. 5 shows screen shots depicting spatial coverage as the query generation method of the invention progresses.
Figure 5B:
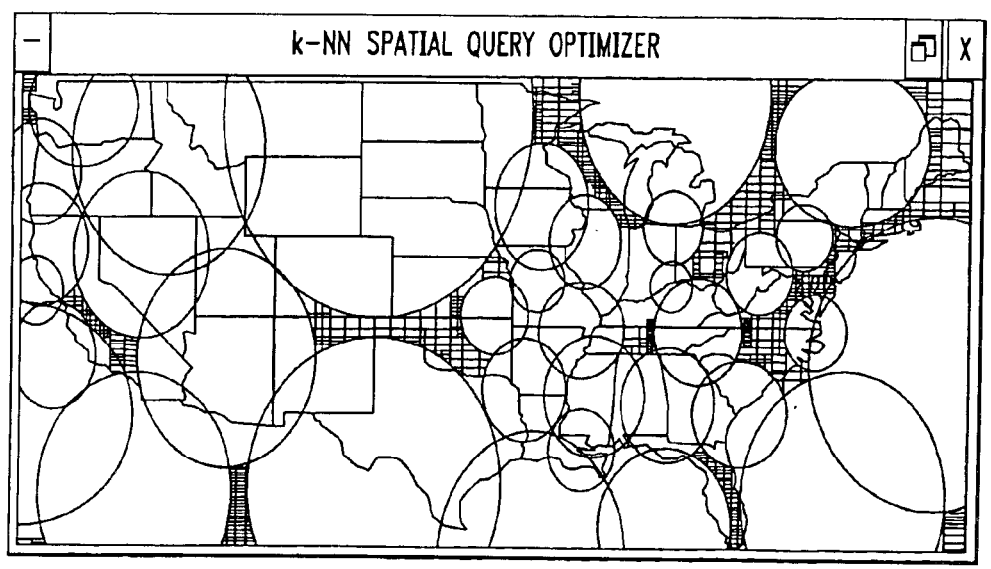
Figure 5C:
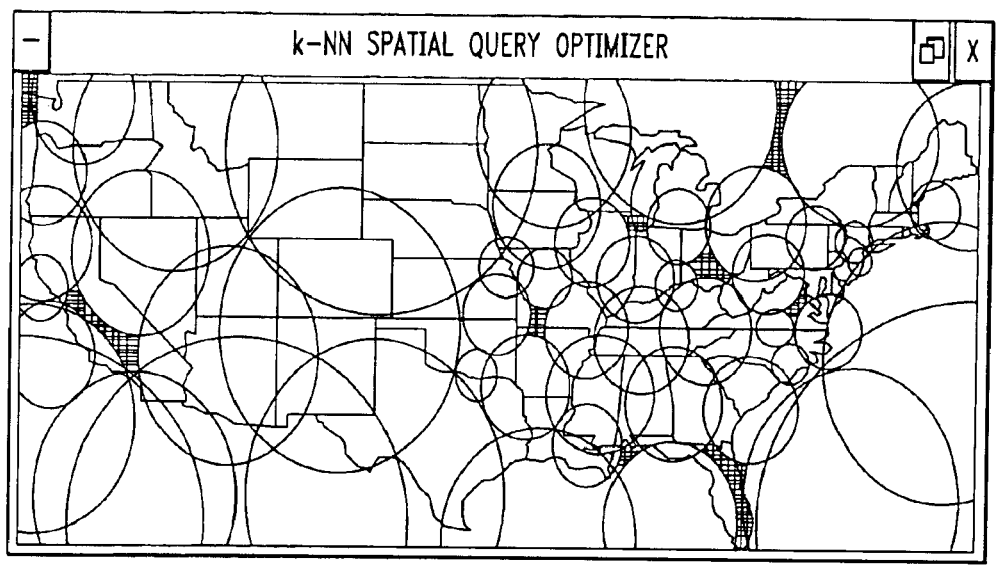
Figure 5D:
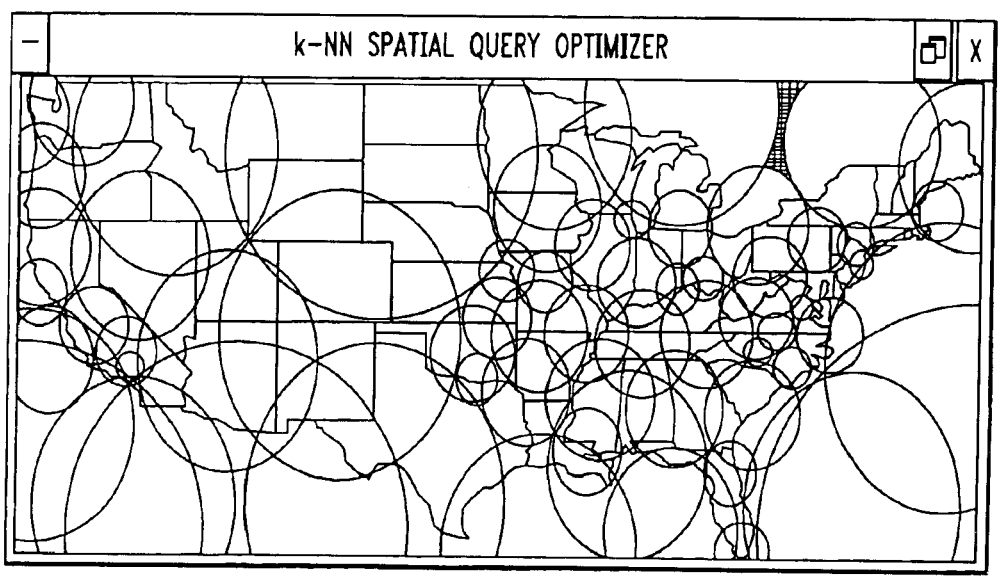

The query generation method of the invention was implemented on a system composed of two parts: one written in Perl, which serves as the query engine, and the other in C++, which implements the quadtree, and provides some simple graphical output. Two data sets were examined. The data were available on the World Wide Web and represent store locations of two different businesses (FIGS. 4A and 4B). One business (FIG. 4A) has about 750 stores, the other (FIG. 4B) has about 850 stores.

Using the naive ZIP code technique described above, an unacceptably large block of time is required to cover the database. Specifically, a single ZIP code query (which returns 10 stores) can be performed in 1.2 seconds. To cover the United States, over 10,000 queries (corresponding to the different ZIP codes) are required at a total cost of 12,000 seconds, or over three-and-a-half hours.

Progress of the above-described method for generating queries is shown graphically in the screenshots of FIG. 5, where k=20. Each screenshot depicts a state of the quadtree at a particular stage of execution. The covered region is shown in gray; the uncovered region is shown in white. The circles represent the radii of the nearest-neighbor queries. In the background, in black, is an outline of a map of the United States.

Several patterns are apparent from the figures. In (a), one can clearly see the data-sensitive nature of the k-NN queries. Also, it is possible to see that the scheme effectively spreads the queries. In (b)–(d), it can be seen what happens as the spaces get covered. From the small circles at the final stages of the query execution, it can be observed that it gets progressively more difficult to find large empty regions, hence efficiency decreases as the algorithm progresses. As can be seen, most of the queries performed towards the end do not actually find stores, but mostly serve the purpose of guaranteeing that the domain R is properly covered.

The query generation method of the present invention requires only 191 queries at a total cost of 229 seconds. This is over 52 times faster than the naive ZIP code technique.

In order to measure the performance of our techniques, it is useful to determine what is the optimum number of queries possible. Given a dataset D with |D|=n sites, and a k-NN query engine that returns k answers per query, $$OPT(D) = \left\lceil \frac{n}{k} \right\rceil$$

is the smallest number of queries necessary to find all n answers.

Let QUAD(D) be the number of queries performed by the technique, where in general OPT(D)≦QUAD(D). An approximation factor, ρ(D), is defined to be the ratio between our algorithm and the optimum; that is, $$\rho(D) = \frac{QUAD(D)}{OPT(D)}$$

Note that by definition ρ(D)≦1, with equality when every query returns k distinct, unseen sites.

FIG. 6 is a table showing the number of queries and approximation factors obtained by the described method while searching for all the stores in Dataset 1 (FIG. 4A) and Dataset 2 (FIG. 4B). The query generation method of the invention achieves roughly an approximation factor ρ(D) of 2.5 of optimum for those datasets. Thus, further improvements are limited to factors of 2.5, as opposed to the factor-50 improvement that the method achieves over the naive method.

The query generation method of the invention is completely blind about the areas it has not seen thus far. The basic principle used is to place queries away from areas already covered and into the region containing the largest empty circle, hence avoiding inefficiencies in coverage. For efficiency and simplicity, the method does not actually find the largest empty circle in the uncovered region, as that would require incremental maintenance of the medial-axis of the covered region. Because of the difficulties involved, the method instead simply uses the largest uncovered quadtree node.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on data available on the Internet. However, the principles of the present invention could be extended to other large networks where data is available through discrete queries. Such an extension could be readily implemented by one of ordinary skill in the art given the above disclosure.

What is claimed is:

1. A machine readable medium containing configuration instructions for performing a method for retrieving data accessible by posing a plurality of queries over a network to at least one target server, wherein the plurality of queries are posed through a restricted interface that returns the k data points closest to a query point, the method comprising the steps of:

selecting a plurality of proxy server services;

transmitting a first one of the plurality of queries to a first one of the plurality of proxy sever services for transmission to one of the at least one target servers;

transmitting a second one of the plurality of queries to a second one of the plurality of oxy server services for transmission to one of the at least one target servers;

for each one of the plurality of queries, receiving from its corresponding proxy server service a reply from its corresponding target server;

calculating a maximum radius from a previous query point to a data point returned by e corresponding query;

determining a region with R covered by the previous query based on the corresponding maximum radius;

computing quadtrees of progressively greater levels until a computed quadtree has an uncovered node entirely outside the covered region; and constructing a subsequent query to contain a query point that is a center of the uncovered quadtree node.

* * * * *

UNITED STATES PATENT AND TRADEMARK OFFICE
CERTIFICATE OF CORRECTION

PATENT NO. : 6,925,461 B2 Page 1 of 1
APPLICATION NO. : 10/022788
DATED : August 2, 2005
INVENTOR(S) : Simon D. Byers It is certified that error appears in the above-identified patent and that said Letters Patent is hereby corrected as shown below:

Column 10, line 49, "with", should read --within--.

Signed and Sealed this

Third Day of April, 2007

JON W. DUDAS
*Director of the United States Patent and Trademark Office*